(12) United States Patent
Baar et al.

(10) Patent No.: US 9,418,323 B2
(45) Date of Patent: Aug. 16, 2016

(54) GHOSTING COMPENSATION IN RELIEF IMAGES FOR DIRECTIONAL PRINTS

(71) Applicant: OCE-TECHNOLOGIES B.V., Venlo (NL)

(72) Inventors: Teun R. Baar, Venlo (NL); Marjan Shahpaski, Venlo (NL); Maria V. Ortiz Segovia, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/610,740

(22) Filed: Jan. 30, 2015

(65) Prior Publication Data

US 2015/0220821 A1  Aug. 6, 2015

(30) Foreign Application Priority Data

Jan. 31, 2014  (EP) ..................... 14153422

(51) Int. Cl.
| | | |
|---|---|---|
| G06K 15/02 | (2006.01) | |
| H04N 1/60 | (2006.01) | |
| B05D 5/06 | (2006.01) | |
| B41M 3/00 | (2006.01) | |

(52) U.S. Cl.
CPC ............. *G06K 15/1878* (2013.01); *B05D 5/06* (2013.01); *B41M 3/00* (2013.01); *G06K 15/027* (2013.01); *H04N 1/60* (2013.01); *H04N 1/605* (2013.01)

(58) Field of Classification Search
None
See application file for complete search history.

(56) References Cited

U.S. PATENT DOCUMENTS

| 5,471,881 A * | 12/1995 | Hochstein ................. G01D 7/00 359/22 |
|---|---|---|
| 6,405,464 B1 | 6/2002 | Gulick, Jr. et al. |
| 7,092,128 B2 | 8/2006 | Wang et al. |
| 2002/0131062 A1 * | 9/2002 | Neri ......................... B41F 16/00 358/1.9 |
| 2005/0030560 A1 * | 2/2005 | Maltz .................... H04N 1/6058 358/1.9 |
| 2005/0052750 A1 * | 3/2005 | King ........................ B05D 1/40 359/619 |
| 2006/0066879 A1 * | 3/2006 | Bast ....................... B41J 29/393 358/1.1 |
| 2006/0191177 A1 * | 8/2006 | Engel ..................... B60K 35/00 40/453 |
| 2007/0211347 A1 * | 9/2007 | King ........................ B05D 1/40 359/619 |
| 2007/0216978 A1 * | 9/2007 | Kitamura ................. G03H 1/08 359/9 |
| 2008/0131667 A1 * | 6/2008 | King ........................ B05D 1/40 428/195.1 |
| 2009/0091591 A1 * | 4/2009 | Sivan ...................... B41M 3/16 347/9 |
| 2009/0186308 A1 * | 7/2009 | Rudolph .................. B41M 1/04 430/325 |

(Continued)

FOREIGN PATENT DOCUMENTS

| GB | 2 422 742 A | 8/2006 |
|---|---|---|
| WO | WO 2008/102366 A2 | 8/2008 |

(Continued)

*Primary Examiner* — Ted Barnes
(74) *Attorney, Agent, or Firm* — Birch, Stewart, Kolasch & Birch, LLP

(57) ABSTRACT

A method is provided for combining two source images in a relief image. Structural elements are applied that allow a first image to be observed in a first viewing direction and a second image in a second viewing direction. The method reduces a ghosting effect by a) printing a test relief image wherein the two source images comprise patches with a number of basic colors having a predefined amount of colorant; b) measuring for each patch an observed color in each of the viewing directions; c) scaling the source images such that an image element matches a size of a structural element in the relief image; d) selecting a structural element from the test relief image, wherefore the color differences between the image elements of the scaled source images and the patch color becomes minimal, and e) composing a relief image from the selected structural elements.

9 Claims, 2 Drawing Sheets

(56) References Cited

U.S. PATENT DOCUMENTS

| | | | | |
|---|---|---|---|---|
| 2009/0284798 A1* | 11/2009 | Blum | .................... | H04N 1/4058 358/3.06 |
| 2010/0231980 A1* | 9/2010 | Chapman | ............... | B41M 3/148 358/3.28 |
| 2010/0245926 A1* | 9/2010 | Blum | .................... | H04N 1/4058 358/3.06 |
| 2011/0249298 A1* | 10/2011 | Gullentops | ......... | B29C 67/0059 358/1.18 |
| 2012/0033305 A1* | 2/2012 | Moon | .................... | G02B 3/005 359/619 |
| 2012/0074055 A1* | 3/2012 | Osterfeld | ............... | B01D 35/30 210/435 |
| 2013/0065024 A1* | 3/2013 | Aruga | ..................... | B05D 5/02 428/172 |
| 2013/0154251 A1* | 6/2013 | Jolic | .................... | G02B 3/0006 283/85 |
| 2015/0064342 A1* | 3/2015 | Dodds | .................... | B05D 3/042 427/8 |
| 2015/0258736 A1* | 9/2015 | Chen | .................... | B29C 67/0088 700/98 |
| 2015/0301234 A1* | 10/2015 | Bin-Nun | ............ | H04N 1/00201 359/619 |

FOREIGN PATENT DOCUMENTS

| | | |
|---|---|---|
| WO | WO 2009/048718 A2 | 4/2009 |
| WO | WO 2010/016061 A1 | 2/2010 |

\* cited by examiner

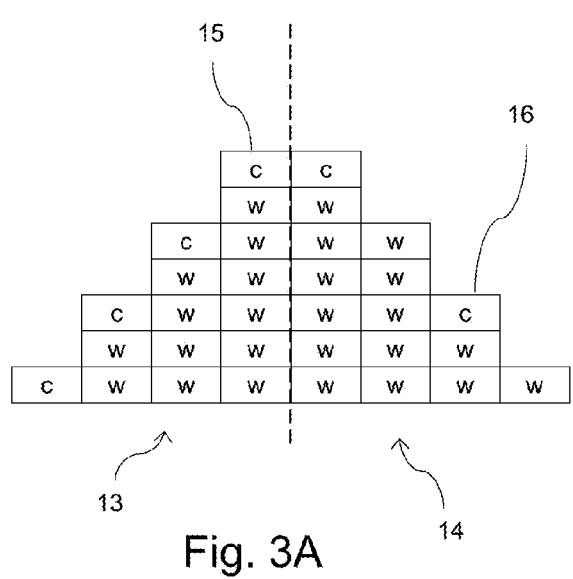
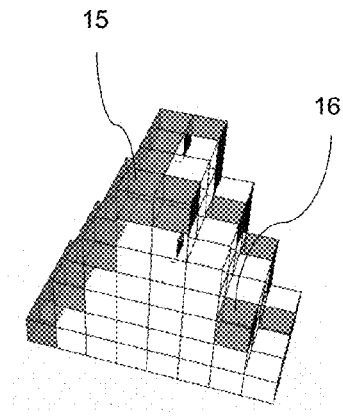
Fig. 3A  Fig. 3B
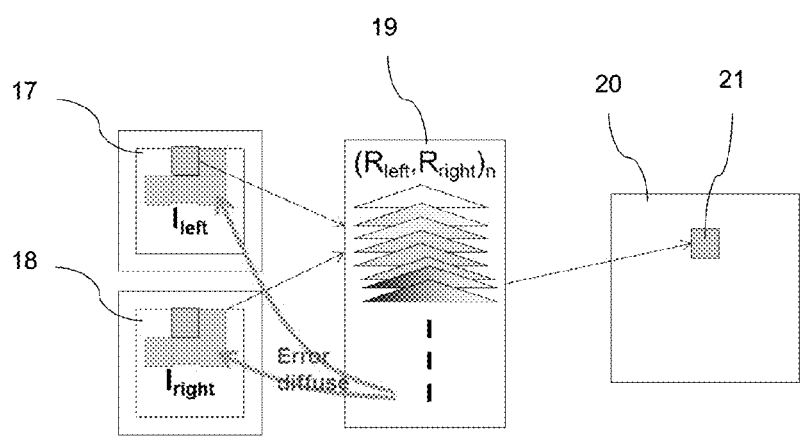
Fig. 4

GHOSTING COMPENSATION IN RELIEF IMAGES FOR DIRECTIONAL PRINTS

BACKGROND OF THE INVENTION

1. Field of the Invention

Color printers are available for printing many different kind of images, such as text documents and digital photographs, in all imaginable sizes. Most of these images are two-dimensional in nature and the extension of the colorants in a third dimension is usually very limited. Still, relief images are known, wherein multiple colorant layers are printed onto each other on a flat substrate, thereby obtaining an elevated surface. Also, three-dimensional printers for producing objects of arbitrary shape have become ubiquitous in recent years, using many different materials than the usual inks and toners of traditional color printers. The availability of all these printers has triggered creativity for developing image processing methods that enable a printer to produce new types of prints. The present invention relates to a method for combining two source images in a relief image with structural elements having at least two principle surface orientations, such that a first image is observed in a first viewing direction and a second image is observed in a second viewing direction, the method reducing a ghosting effect. The present invention further relates to a computer program product comprising instructions for executing the invented method.

2. Description of the Related Art

Directional prints are substantially flat objects that show a different image from different viewing directions. An internal structure in the directional print causes this effect. An example of these prints are so-called lenticular prints that include an array of cylindrical lenses, or lenticules, in a lenticular material onto a sequence of spatially multiplexed images that are viewed through the lenticular material. The effect is that a viewer observes different ones of the multiplexed images at different viewing angles. A lenticular image, comprising the sequence of spatially multiplexed images, is formed by decomposing each of several images into image elements equaling the number of lenticules in the lenticular lens element. Depending on particular details like the image content, the quality of the lenticular material, and the alignment precision of the printed image to the lenticular material, complete extinction of an image that is intended not to be seen from a specific viewing direction, does not occur. This ghosting effect may be suppressed by introducing transition regions between the different spatially multiplexed images in the lenticular image, as described in U.S. Pat. No. 6,405,464.

Another example of a directional print is provided by the application of glossmarks for graphics enhancement, as provided in U.S. Pat. No. 7,092,128. Herein, a single image is spatially modulated by a mask layer that selects between two halftones with anisotropic structure characteristics which are significantly different in orientation while remaining identical in density. An effect of these prints is that from a viewing angle perpendicular to the printed substrate, a single image is preceived, whereas from other angles a gloss modulation is visible.

The directional prints in the present invention are made by introducing structural elements in a relief image that is printed on a flat substrate, the structural elements having principle orientations that are not parallel to the substrate. Besides the usual color channels, the relief images for making these prints comprise an elevation channel for defining a height for each pixel. This height is realised by printing a number of dots onto each other. The height of a stack of dots and the orientation of a surface of the structural elements that result from these stacks influence the perception of the print in dependence on the viewing angle relative to the flat surface of the substrate. In particular, if a surface oriented in one direction carries a first image and another surface oriented in a second direction carries a second, different image, the perceived image will be direction dependent. The partial perception of the second image when viewing in the first direction and vice versa is a ghosting effect. A problem of the current state of the art is that no method exists to reduce this ghosting effect. An object of the present invention is to combine images to a relief image that reduces the ghosting effect.

SUMMARY OF THE INVENTION

According to the present invention, a method is provided for combining two source images in a relief image with structural elements having at least two principle surface orientations, such that a first image is observed in a first viewing direction and a second image is observed in a second viewing direction, the method reducing a ghosting effect and comprising the steps of: a) printing a test relief image comprising patches with structural elements having a first basic color on a surface with a first principle orientation and a second basic color on a surface with a second principle orientation, a basic color being a color having a predefined amount of colorant; b) measuring for each patch a first observed color in a first viewing direction and a second observed color in a second viewing direction; c) scaling a first source image and a second source image such that each image element has a size corresponding to a structural element in the relief image; d) selecting for each position in the relief image a structural element from a patch in the test relief image, wherefor a sum of a color difference between an image element of the scaled first source image and a first observed color and a color difference between an image element of the scaled second source image and a second observed color becomes minimal, and e) composing a relief image from the selected structural elements. A perceived color in a first direction depends not only on the first basic color, but also on the second basic color, due to the ghosting effect. By selecting a structural element for which an observed color in its surrounding, including a color of a second image, is compared to an intended color, the ghosting effect is reduced. This is done for both images by minimizing a sum of a color difference in both directions. The resulting relief image comprises structural elements with a basic color on either side of the structural element, the basic color having a minimal color difference with the intended color of the corresponding image element at the position of the structural element in the relief image. This solves a problem for these relief images.

In a further embodiment, the test relief image comprises structural elements having a triangular profile with two principle surface orientations for showing two images in two directions. The test relief image comprises a first basic color on the surfaces with a first orientation and a second basic color on the surfaces of a second orientation. Measurements are performed in a viewing direction wherein the surfaces with a first orientation are dominant and in a second viewing direction wherein the surfaces with a second orientation are dominant. The measurement data include the ghosting effect. Two source images that are used to compose a relief image using the structural elements from this testchart according to the method described above will thus be made visible in the respective directions.

Further details of the invention are given in the dependent claims. The present invention may also be embodied in a computer program product, including computer readable code embodied on a non-transitory computer readable medium, said computer readable code comprising instructions for executing the steps of the invented method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A and 3B show the ink dots for making a structural element; and

FIG. 4 is an overview of a composition of two source images in a relief image.

DETAILED DESCRIPTION OF EMBODIMENTS

Figure 1:
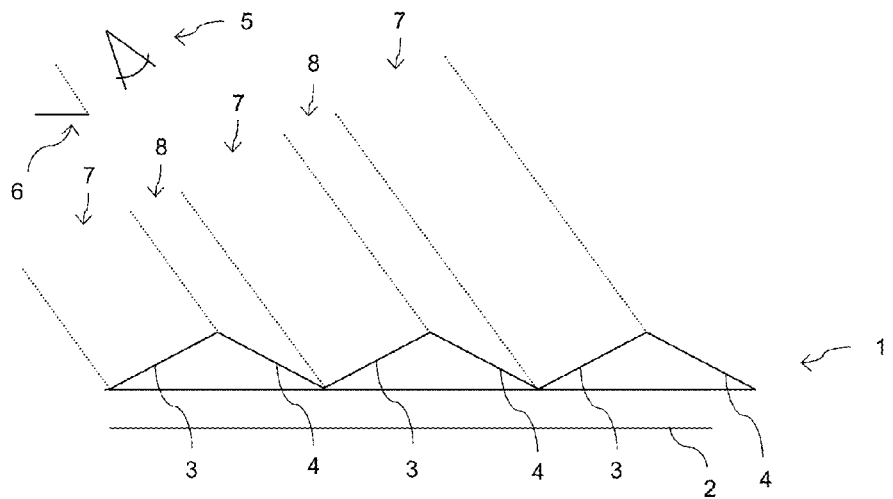
FIG. 1 shows an example of structural elements in a relief print.

The present invention will now be described with reference to the accompanying drawings, wherein the same or similar elements are identified with the same reference numeral.

FIG. 1 shows a profile of a relief print with structural elements 1 on a flat substrate 2. The structural elements have each two principle surface orientations, one, surface 3, directed to the left side and one, surface 4, directed to the right side in the figure. A relief print is obtained by applying a varying amount of ink dots on top of each other as defined in a relief image that comprises a separate channel for indicating a height or elevation for each pixel in the image besides the customary channels for indicating a color or an amount of colorant for each pixel. The profile in FIG. 1 is obtained by increasing the height for a number of consecutive pixels and decreasing the height for a next number of consecutive pixels, as will be further illustrated in a next figure.

Observing the relief print from the left side, indicated by the eye 5, at an angle 6 with the plane of the substrate, more light 7 is coming from the surfaces directed to the left side 3 than light 8 is coming from the surfaces directed to the right side. A different amount of colorant may be printed on the surfaces 3 than on the surfaces 4 to enable a different perceived color from the left and the right side. The ink, which may be any type of colorant that is applicable to print the structural elements, such as hot melt ink, or UV-curable ink, may be partly transparent, thereby adding to a ghosting effect that is caused by the visibility of the surfaces 4, oriented to the right side, when observing from the left side, as in the figure. In a specific embodiment, the base of the equilateral elements is 0.42 millimeter, whereas their height is about 0.1 millimeter. A color is measured for a test patch having a number of structural elements with a first basic color on the surfaces oriented to the left at an characteristic angle of 60 degrees with the substrate plane. Similarly, a color is measured for a test patch having a number of structural elements with an independently determined second basic color on the surfaces oriented to the right at an characteristic angle of 60 degrees with the substrate plane, but obviously from the right side.

Figure 2:
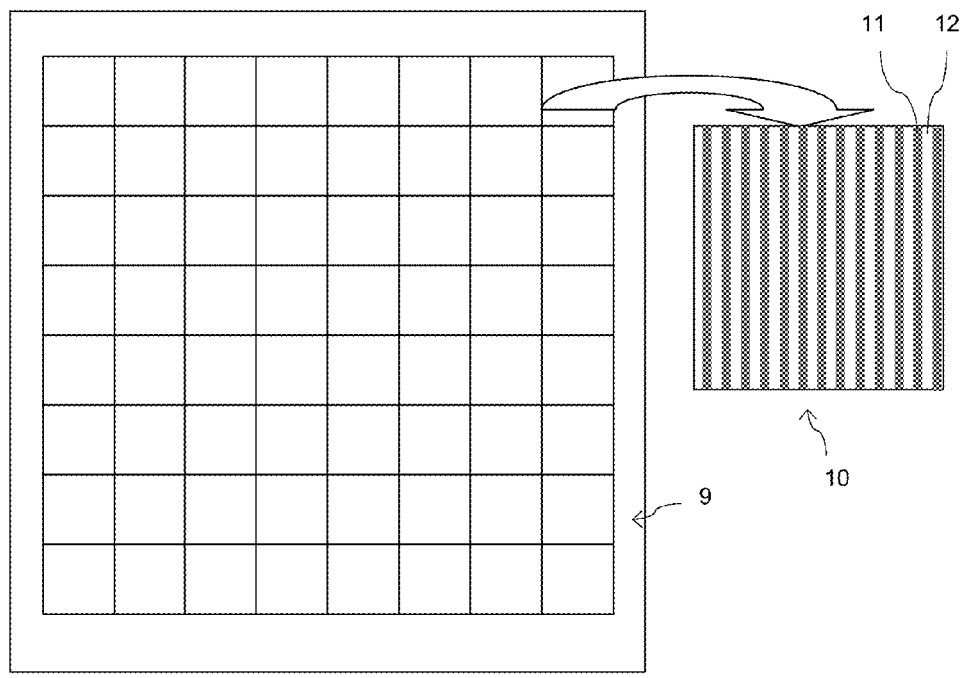
FIG. 2 is a layout of a test relief image with structural elements.

FIG. 2 shows an arrangement of test patches 9 in a test relief image. Each of the patches comprises a number of similar structural elements. A test patch 10 comprises a first basic color 11 from a predetermined amount of colorant on one side of the structural elements and a second basic color 12 from another predetermined amount of colorant on a second side of the structural elements. Measurements of the color of these test patches are made from two directions. In a specific embodiment, a color gamut is constructed from the measurements. This gamut comprises all achievable colors in one direction. The colors appearing in a source image may be compressed into this gamut, before being combined in a relief image, as will be described with reference to FIG. 4.

FIG. 3A and FIG. 3B show a scheme for stacking ink dots onto each other. In this case four consecutive pixels define an increasing height and four consecutive pixels define a decreasing height. In a second direction, the height of the pixels does not change. In a specific embodiment, a Color-Wave 650 of Océ-Technologies has been used to print the relief image. This printer applies hot melt ink in the customary colors cyan (c), magenta, yellow and black and is controlled with an addressability of 600 dpi. The black ink is replaced by a commercially available white ink (w). This white ink is very suitable for printing stacks of colorant dots with the purpose of creating an image with colored pixels. In FIG. 3A, the left part 13 of a structural element, with a surface oriented to the left side, comprises a number of cyan dots 15 on top of a stack of white dots (w), whereas a right part 14 of a structural element, with a surface oriented to the right side, comprises less cyan dots 16 on top of a stack of white dots (w). The right part 14 may also comprise another colorant than the left part 13. In FIG. 3B, a perspective view is given to demonstrate that a larger number of top positions is available for application of a colorant. However, after a number of pixels, the pattern is repeated.

FIG. 4 shows how two source images, image $I_{left}$ 17 and image $I_{right}$ 18 are combined in a relief image 20. The source images have been scaled such that each pixel has the size of a structural element. In a specific embodiment, each source image is defined at 300 ppi (pixel per inch). If the structural elements have a size of 8×4 pixels for a 600 dpi printer, as shown in FIG. 3A and FIG. 3B, the number of pixels of the source images are reduced in one direction by a factor of 4 and in a second direction by a factor of 2, obtaining two 75×150 ppi images. Note that the source images only have color channels and an elevation channel for the relief image 20 is defined separately, in accordance with the elevation channel of the test relief image.

For each pixel position in the scaled images, a structural element is selected from the set of structural elements 19, for which a color measurement has been made in two directions. These measurements are indicated by a set of colors $C_{left}$, $C_{right}$, each of the colors having three components. To a pixel having a color L in image 17 and a color R in image 18 a structural element is selected for which $|L-C_{left}|+|R-C_{right}|$ is minimal, wherein $|C_1-C_2|$ indicates a color difference between the colors $C_1$ and $C_2$, such as deltaE in an L, a, b space. The selected structural element is placed at a corresponding position 21 in the relief image. In a specific embodiment, a color difference $L-C_{left}$ for the selected element is distributed over not yet processed pixels of image 17 and a color difference $R-C_{right}$ for the selected element is distributed over not yet processed pixels of image 18, in a similar way as error diffusion for 2D images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for combining two source images in a relief image with structural elements placed on a flat substrate and having at least two principle surface orientations, such that a first image is observed in a first viewing direction and a second image is observed in a second viewing direction, the method reducing a ghosting effect and comprising the steps of:
   a) printing a test relief image comprising patches with structural elements having a first basic color on a surface with a first principle orientation and a second basic color on a surface with a second principle orientation, a basic color being a color having a predefined amount of colorant;
   b) measuring for each patch a first observed color in a first viewing direction and a second observed color in a second viewing direction;
   c) scaling a first source image and a second source image such that each image element has a size corresponding to a structural element in the relief image;
   d) selecting for each position in the relief image a structural element from one patch out of said patches in the test relief image, wherein said one patch is selected in such a manner that a sum of a color difference between an image element of the scaled first source image and a first observed color of said one patch and a color difference between an image element of the scaled second source image and a second observed color of said one patch is the smallest compared to the rest of said patches; and
   e) composing a relief image from the selected structural elements.

2. The method according to claim 1, wherein the structural elements have a triangular profile with two principle surface orientations for showing two images in two directions.

3. The method according to claim 2, wherein the triangular profile is isosceles with a top angle of 135 degrees.

4. The method according to claim 1, wherein each first basic color in the test relief image is on one side of a structural element with at least two different second basic colors on a second side.

5. The method according to claim 1, wherein the structural elements are composed of white ink with colored ink on top.

6. The method according to claim 1, wherein the first and second viewing directions are at an angle of 60 degrees with respect to a plane parallel with the flat substrate.

7. The method according to claim 1, wherein an additional step of compressing a gamut of the first and second source image to an available gamut for relief images is performed.

8. The method according to claim 1, wherein a color difference between an image element of the scaled first source image and a first observed color of a selected structural element is passed to the image elements of the scaled first source image that are not yet processed and a color difference between an image element of the scaled second source image and a second observed color of said selected structural element is passed to the image elements of the scaled second source image that are not yet processed.

9. A computer program product, including computer readable code embodied on a non-transitory computer readable medium, said computer readable code comprising instructions for executing the steps of the method of claim 1.

* * * * *